(12) United States Patent
Bigelow

(10) Patent No.: US 7,204,460 B2
(45) Date of Patent: Apr. 17, 2007

(54) ORBITAL DEBRIS SHIELD

(75) Inventor: Robert T. Bigelow, Las Vegas, NV (US)

(73) Assignee: Bigelow Aerospace, North Las Vegas, NV (US)

( * ) Notice: Subject to any disclaimer, the term of this patent is extended or adjusted under 35 U.S.C. 154(b) by 1 day.

(21) Appl. No.: 10/875,710

(22) Filed: Jun. 24, 2004

(65) Prior Publication Data

US 2005/0284986 A1    Dec. 29, 2005

(51) Int. Cl.
*B64G 1/40* (2006.01)

(52) U.S. Cl. .................................................. 244/171.1

(58) Field of Classification Search ................ 244/173, 244/158.1, 158.3, 159, 159.5, 171.7, 159.2
See application file for complete search history.

(56) References Cited

U.S. PATENT DOCUMENTS

| | | | | |
|---|---|---|---|---|
| 4,825,599 A * | 5/1989 | Swann, Jr. | ..................... | 52/2.15 |
| 5,601,258 A * | 2/1997 | McClymonds | ........... | 244/171.7 |
| 5,610,363 A * | 3/1997 | Crews et al. | .............. | 89/36.02 |
| 6,231,010 B1 * | 5/2001 | Schneider et al. | ....... | 244/158.3 |
| 6,298,765 B1 * | 10/2001 | Dvorak | ....................... | 89/36.02 |
| 6,547,189 B1 * | 4/2003 | Raboin et al. | ........... | 244/158.3 |
| 6,568,640 B1 * | 5/2003 | Barnett | ..................... | 244/158.3 |
| 6,962,310 B1 * | 11/2005 | Bigelow | ................... | 244/158.1 |
| 6,974,109 B1 * | 12/2005 | Mezits et al. | ............ | 244/158.3 |
| 2002/0195030 A1 | 12/2002 | Christiansen et al. | | |
| 2005/0058965 A1 * | 3/2005 | Bigelow | ....................... | 434/34 |
| 2005/0284986 A1 * | 12/2005 | Bigelow | ................... | 244/171.7 |

OTHER PUBLICATIONS http://www.answers.com/gore&r=67, pp. 1-6.*

* cited by examiner

*Primary Examiner*—Teri Pham Luu
*Assistant Examiner*—Stephen A Holzen
(74) *Attorney, Agent, or Firm*—Franklin E. Gibbs

(57) ABSTRACT

An orbital debris shield for protecting the hull of a spacecraft is claimed. The shield is comprised of a number of flexible and releasably attached gores that substantially cover the hull. Interleafed between layers of the gores are layers of a spacing material. As debris collides with the gores, the material is shocked and breaks up to some degree. As the shocked debris disperses through a layer of the gore, the spacing material interacts with the debris. After dispersing through a number of layers of the gores and the spacing material, the debris transfers a significant portion of kinetic energy and the probability of the remaining particles piercing the hull is significantly decreased.

4 Claims, 4 Drawing Sheets

ORBITAL DEBRIS SHIELD

BACKGROUND OF THE INVENTION

1. Field of the Invention

This invention relates to a debris shield to provide a measure of protection to the hull of a spacecraft from impacting space debris.

2. Description of the Prior Art

Space exploration poses a number of risks that are unique and unparalleled on Earth. For example, it is commonly known that there are a vast number of fast moving particles of space debris in the vicinity of the Earth and in the Earth's orbit. This is partially a result of years of launching space vehicles that have left matter that did not reenter the Earth's atmosphere and disintegrate. Another source of this debris is naturally occurring particles such as micro meteors.

Many of these particles have sufficient momentum to penetrate the hull of a spacecraft. In those instances where the craft is not habited, the penetrations could damage or destroy equipment onboard the craft. In case where the spacecraft is inhabited, penetration of the hull can lead to a loss of atmosphere and potentially a loss of human life. In either case, space vehicles need to have protection from impacting space debris.

One method of protecting spacecraft from the potential damage of fast moving space particles has been the use of a "Whipple Shield." An enhanced Whipple Shield is described in U.S. Pat. No. 5,610,363 to Crews, et al. Basically, a Whipple Shield has a number of particle shocking layers spaced apart and the shield covers the hull of a spacecraft. As a particle impacts a layer of the shield, the particle's kinetic energy is converted by way of the interaction with the shield and this conversion results in the particle being broken into fragments and dispersed in a cone or plume fashion. Each successive layer of the shield continues to break the particles into smaller and smaller debris elements until, ideally, the particle is fragmented into a mist of micro particles and the kinetic energy is either transferred to the shield or over a wide range of extremely small particles moving at substantially lower velocities.

Early Whipple Shields used layers of metals such as aluminum to impact the particles. This had several disadvantages. For example, the shields tended to be very heavy. With launch costs being directly related to weight, this meant that the use of a metal shield was very expensive. Also, The metal layers were rigid and thus the volume of a spacecraft was fixed.

While fixed volume spacecraft using a rigid hull have been used widely, a revolutionary flexible hulled craft is now being developed. An inflatable modular structure is a unique approach at providing a cost effective, large volume, habitable working environment for use in space and on extraterrestrial bodies. This approach is distinct due to the characteristic structure of the module.

The inflatable structure has a truss arrangement predominately surrounded by an inflatable flexible multi-layered shell. This allows for minimizing the volume of the module at launch and maximizing the volume when deployed.

In the pre-deployed configuration, the shell is folded about the truss and secured in such a way that the module can be fitted into the payload section of a conventional launch vehicle. When the payload is launched brought to a desired location, the module is transformed into a deployed configuration.

In this configuration, the flexible shell is released and the module is inflated with a gas; usually air. As the volume within the module increases, the shell unfolds and expands. When fully inflated the shell encompasses a volume that is far greater than the comparable volume in a solid hulled craft of the same launch dimensions.

Whipple Shield technology began transitioning into softer materials such as ceramic cloth for use as sacrificial impacting and disrupting layers. In U.S. Pat. No. 6,298,765 to Dvorak, multiple layers of soft impacting materials are separated by open cell foam. The shield is comprised of an assembly of a number of impacting and separating layers that are covered and the cover is attached to the surface of a spacecraft. Each assembly is a complete shield segment that is designed to attach to the spacecraft, but not to other segments. The flexible disrupting/shocking material can, for example, include Kevlar®, Nextel® ceramic fiber cloth, and Beta Cloth™.

Another flexible Whipple Shield is described in U.S. Pat. No. 6,547,189 to Raboin, et al. The meteor orbital debris (MOD) shield is composed of flexible bumper layers with spacing layers between each bumper layer. In the Raboin patent, the MOD is not segmented in separate assemblies like the shield in the Dvorak patent, but rather is a single shield that covers the spacecraft hull. The Raboin patent was drawn to the use of the shield as part of an inflatable module.

While the aforementioned patents illustrate the use of a flexible debris shield, the shields are either one piece or a number of separate and independent shield segments.

One advantage to the present invention is the ability to piece together the gores into a connected single unit. This allows for more flexibility when installing the shield over the use of a one-piece shield.

Each gore is comprised of flexible disrupting/shocking material. A number of gores are attached one to another to form a covering for the spacecraft hull. Between each gore can be placed a spacing element, most often a type of open cell foam. A number of layers comprising the gores and spacing material may be layered upon the hull. At least the outermost gore is connected to the spacecraft to assist in keeping the shield in place. Also, the debris shield of the present invention can be used with solid and flexible hulled spacecraft.

An advantage to the use of a shield comprised of a flexible gore assembly and open cell foam is that the shield can be folded and compressed for launch and upon deployment the shield can be extended to take advantage of the Whipple Shield type of configuration. The segmented debris shield is thus applicable to solid and flexible hulled crafts.

SUMMARY OF THE INVENTION

This invention is directed to an orbital debris shield for use with the hull of a spacecraft. The debris shield is comprised of a number of flexible gores releasably attached to one another. The plurality of attached flexible gores substantially encloses the hull, and a number of the gores are attached to the spacecraft to facilitate keeping the layer of gores substantially covering the hull.

A spacing element may be placed between the gores and the hull.

A plurality of layer comprising spacing elements and gores may be placed to substantially cover the hull.

DETAILED DESCRIPTION OF THE DRAWINGS

Figure 1:
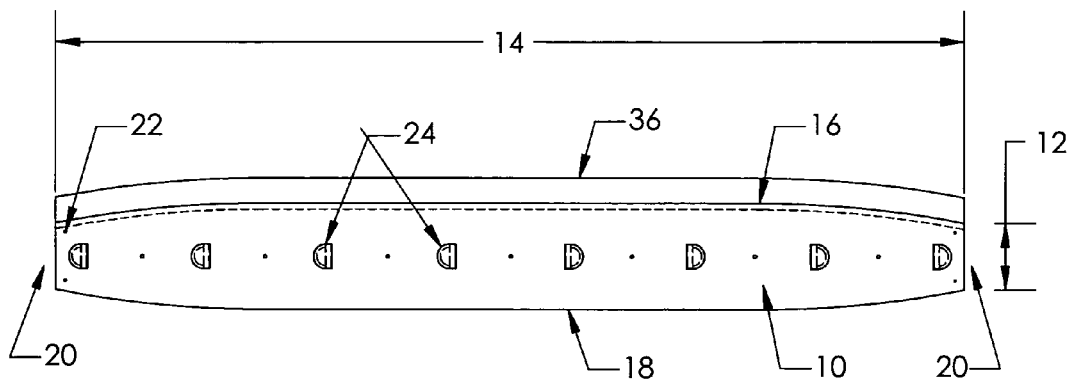
FIG. 1 is a top view of a gore.

The present invention may best be understood by reference to the following description taken in conjunction with the accompanying drawings. FIG. 1 is a top view of a gore 10. The gore has a length 14, a width 16, a first opposing edge 16, a second opposing edge, opposing longitudinal ends 20, attachment holes 22, and air vents 24. In this perspective figure, the first releasable contact-fastener 36 is visible. Furthermore, The geometry of the gore 10 is determined by the geometry of a particular spacecraft hull and the number of gores desired in the particular application. The gore 10 material is chosen partly based upon the flexibility of the material. The flexibility allows for the folding of the gore 10 when the gore 10 is used with an inflatable spacecraft. In the preferred embodiment, the gore is composed of a 3D carbon Fiber material. In alternate embodiments, the gore can be composed of Kevlar®, Nextel® ceramic fiber cloth, Beta Cloth™, or a metal matrix material. The material is chosen based upon weight and environmental factors. Such determinations are within the skill of the art.

Figure 2:
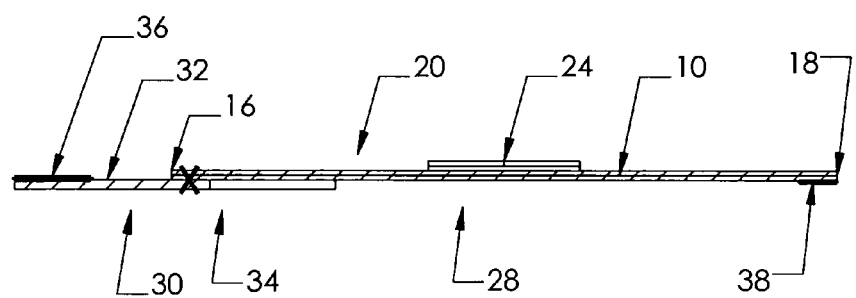
FIG. 2 is a side view of a gore.

FIG. 2 is a side view of a gore 10. There is a top surface 26, a bottom surface 28, an edge strip 30 having a top surface 32 and a bottom surface 34. Along the top surface of the edge strip 32 is a first releasable contact-fastener 36. The top of the edge strip 32 is fixedly attached to the bottom of the gore 28 along the first edge 16 and extending substantially the length of the gore. In the general location of the second edge 18 and on the bottom surface of the gore 28, there is a second releasable contact-fastener 38. The second releasable contact-fastener 38 is fixedly attached to the bottom surface 28 an in the general area of the second edge 18 running substantially the length of the gore. In the preferred embodiment, the contact-fasteners are VELCRO® fasteners. In alternate embodiments, the contact-fasteners could consist of press-studs, hoops and cords. clips, a zipper, a ZIP-LOCK, or opposed strips of resealable adhesive.

Since the gores 10 are combined to form part of a debris shield, it is therefore easier to assemble the gores around a spacecraft as opposed to using a debris shield composed of a single piece of material.

Figure 3:
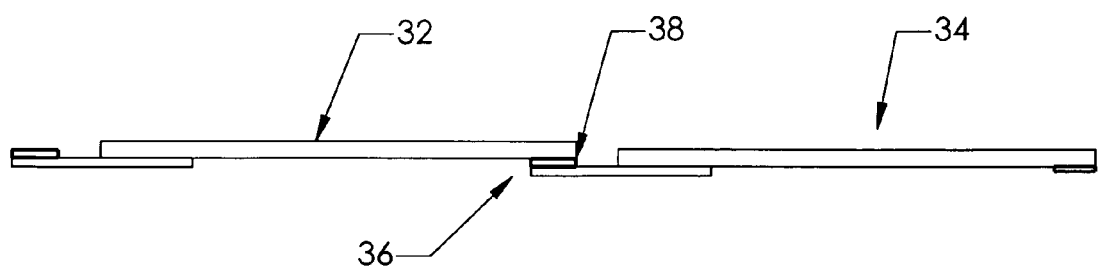
FIG. 3 is a side view of two gores fitted together.

Turning to FIG. 3, a first gore 32 is attached to a second gore 34. The first releasable contact-fastener 36 on the first gore 32 is attached to the second releasable contact-fastener 38 of the second gore 34. This attachment runs the approximately the length of the gores. In this fashion, a plurality of gores can be attached one to another. While the figures depict gores with fasteners running approximately the length of the longitudinal axis, the invention is not restricted to this configuration. A gore can be designed to accommodate other configurations and the fasteners can be applied in accordance with the necessary configuration.

Figure 4:
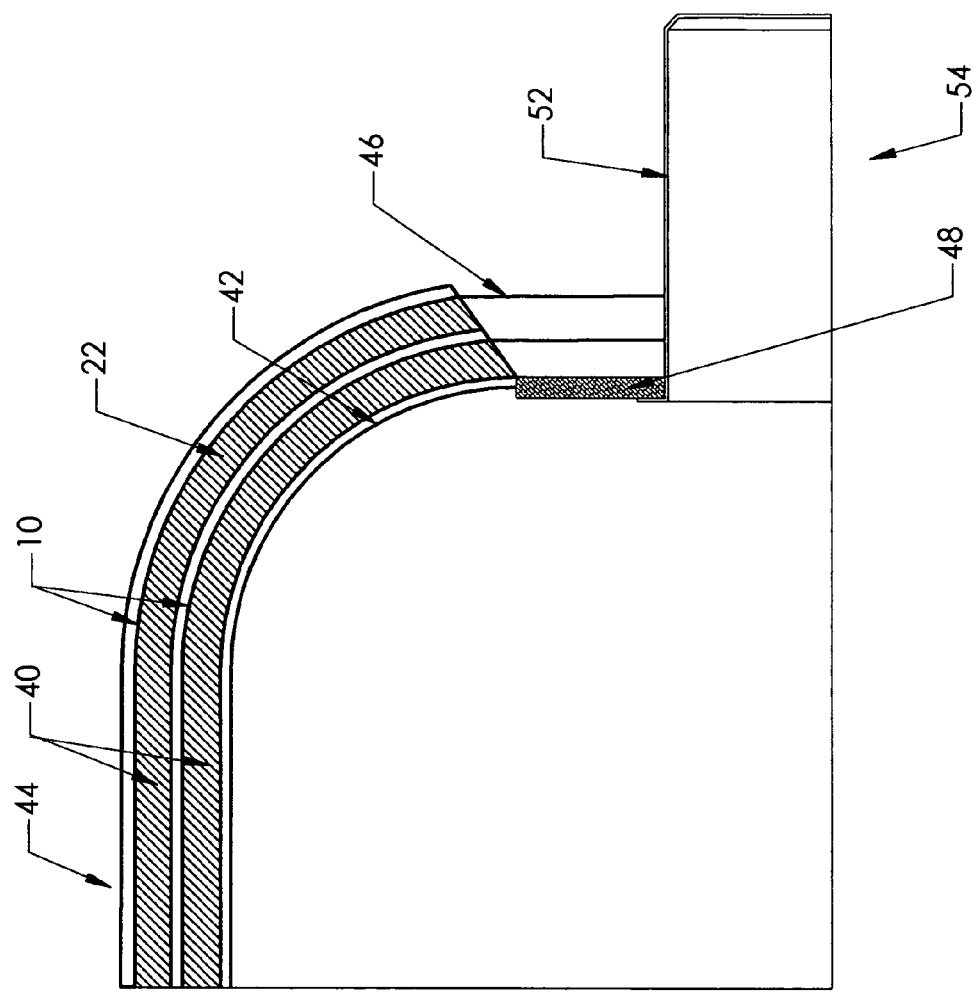
FIG. 4 is a cross-sectional view of an plurality of layers of spacing material and gores attached to the hull of a spacecraft.

FIG. 4 is a cross-sectional view of a segment of a spacecraft. In this figure, multiple layers of releasably attached gores 10 are layered with spacing materials 40. The spacing materials serve multiple functions. First, they serve to separate the gores 10. This is an important feature of Whipple type shields. As debris particles impacts the gore 10 the particles breaks up due to a portion of the transfer of kinetic energy being converted by the particle-gore impact. This process is well known in the art and the type of gore 10 material as well as the thickness of the material chosen is readily determinable given the characteristics of the debris particles and the environment of the spacecraft. Such calculations are identified in numerous sources including U.S. Pat. No. 5,610,363 to Crews, et al. As the shocked debris travels through the gore 10, the particles are dispersed and fan out until hitting the next gore 10. The more spacing material, the greater the dispersion of the particles. Ideally the final spray of fine particles either fails to reach the hull or does so without penetrating the hull.

Second, the particles interact with the spacing material 40. This interaction serves to further transfer the kinetic energy of the debris and lessen the penetration of the particles.

The figure also shows that the debris shield 44 is comprised of a number of alternating layers of spacing materials 40 and gores 10. The debris shield 44 is placed substantially over the hull 42. In the case of FIG. 4, the spacecraft is an inflatable vessel and the hull 42 is comprised of an air barrier and a restraint layer. The attachment holes 22 are used to attach a number of the gores 10 to the spacecraft. In FIG. 4, the attachment is accomplished by the use of cords 46 that are secured to the bulkhead 48. This is the preferred embodiment for attaching the gores 10. In an alternate embodiment, the gores 10 could be attached by other fastening elements besides chords to the bulkhead 48, or an airlock 50, or storage node 52, which are also part of the spacecraft 54. In yet other embodiments, the gores 10 may be attached to the spacecraft 54 at locations other than the attachment holes 22.

Figure 5:
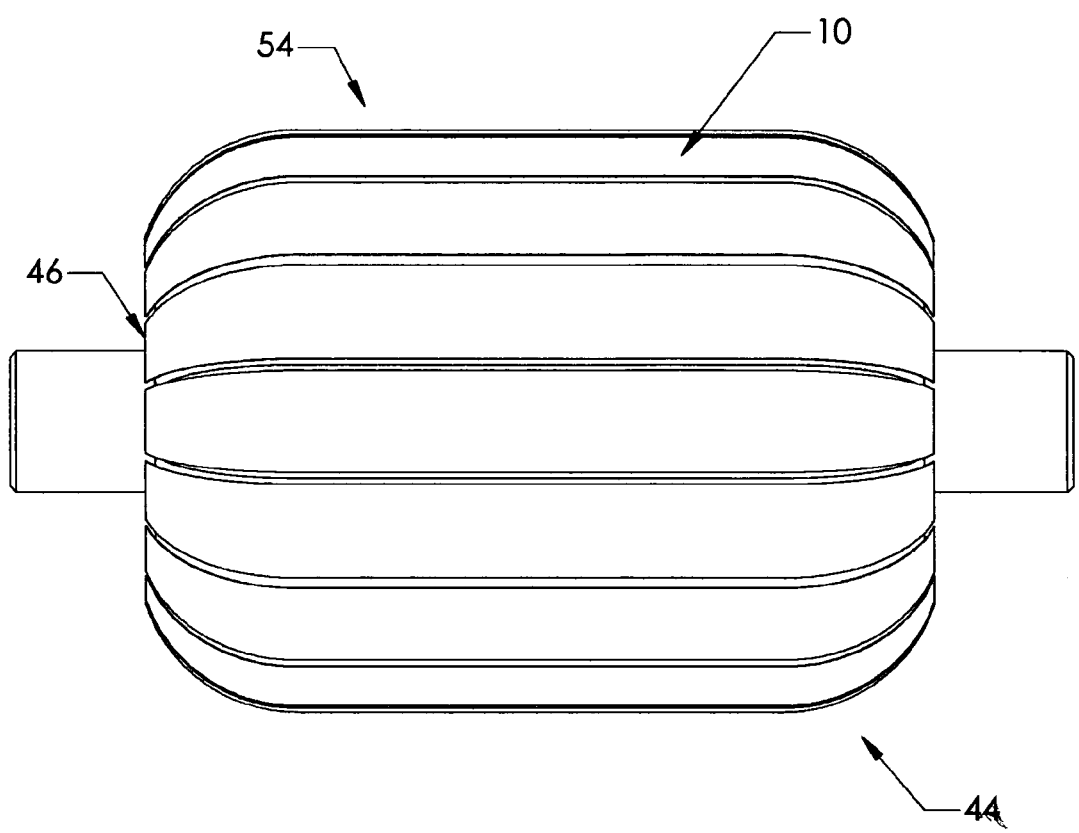
FIG. 5 is a side view of a spacecraft with the shield attached.

Addressing no FIG. 5, the plurality of gores 10 form a layer 54 of flexible gores releasably attached to one another. The layer 54 shown is the outermost layer. The debris shield 44 substantially covers the hull and is attached to the bulkhead 48 by cords 46.

There has thus been described a novel orbital debris shield for protecting the hull of a spacecraft. It is important to note that many configurations can be constructed from the ideas presented. The foregoing disclosure and description of the invention is illustrative and explanatory thereof and thus, nothing in the specification should be imported to limit the scope of the claims. Also, the scope of the invention is not intended to be limited to those embodiments described and includes equivalents thereto. It would be recognized by one skilled in the art the following claims would encompass a number of embodiments of the invention disclosed and claimed herein.

What is claimed is:

1. An orbital debris shield for use with the hull and bulkhead of a spacecraft comprising:
    a plurality of flexible gores releasably attached to one another, the plurality of flexible gores being substantially at an equal radial distance from the hull and the plurality of attached flexible gores substantially enclosing the hull; and
    a number of said gores being directly attached to the bulkhead of the spacecraft.

2. The orbital debris shield of claim 1 further comprising a spacing element disposed between the plurality of flexible gores releasably attached to one another and the hull.

3. An orbital debris shield for use with the hull and bulkhead of a spacecraft comprising:
    a debris layer comprising a plurality of flexible gores releasably attached to one another and a spacing element, the plurality of flexible gores being substantially at an equal radial distance from the hull,
    the plurality of flexible gores substantially enclosing the hull; and a number of said flexible gores being directly attached to the bulkhead of the spacecraft.

4. An orbital debris shield for use with the hull and bulkhead of a spacecraft comprising:

a plurality of releasably attached flexible gores, the plurality of flexible gores being substantially at an equal radial distance from the hull; spacing material;

alternating layers of the spacing material and releasably attached gores substantially enclosing the hull; and a number of the gores being directly attached to the bulkhead of the spacecraft.

* * * * *